US010941225B2

(12) United States Patent
Woods et al.

(10) Patent No.: US 10,941,225 B2
(45) Date of Patent: Mar. 9, 2021

(54) PHOTOCURABLE ELECTRON DEFICIENT OLEFIN-CONTAINING COMPOSITIONS

(71) Applicant: Henkel IP & Holding GmbH, Duesseldorf (DE)

(72) Inventors: John G. Woods, Farmington, CT (US); Mary Palliardi, Andover, CT (US); Joel D. Schall, Hamden, CT (US); Anthony F. Jacobine, North Haverhill, NH (US)

(73) Assignee: Henkel IP & Holding GmbH, Duesseldorf (DE)

(*) Notice: Subject to any disclaimer, the term of this patent is extended or adjusted under 35 U.S.C. 154(b) by 18 days.

(21) Appl. No.: 16/118,676

(22) Filed: Aug. 31, 2018

(65) Prior Publication Data

US 2018/0371124 A1    Dec. 27, 2018

Related U.S. Application Data

(63) Continuation of application No. PCT/US2017/020099, filed on Mar. 1, 2017.

(60) Provisional application No. 62/301,851, filed on Mar. 1, 2016.

(51) Int. Cl.
| | |
|---|---|
| *C08F 22/32* | (2006.01) |
| *C09J 4/00* | (2006.01) |
| *C08F 4/00* | (2006.01) |
| *C08F 220/44* | (2006.01) |
| *C08F 222/32* | (2006.01) |
| *C08F 2/48* | (2006.01) |
| *C08F 222/30* | (2006.01) |
| *C08F 222/14* | (2006.01) |
| *C08F 22/10* | (2006.01) |
| *C08K 3/38* | (2006.01) |

(52) U.S. Cl.
CPC ............... *C08F 22/32* (2013.01); *C08F 2/48* (2013.01); *C08F 4/00* (2013.01); *C08F 22/10* (2013.01); *C08F 220/44* (2013.01); *C08F 222/14* (2013.01); *C08F 222/30* (2013.01); *C08F 222/32* (2013.01); *C08K 3/38* (2013.01); *C09J 4/00* (2013.01)

(58) Field of Classification Search
CPC ............... C08F 222/32; C08F 222/323; C08F 222/324; C08F 222/322; C08F 2/50; C09J 4/00
See application file for complete search history.

(56) References Cited

U.S. PATENT DOCUMENTS

| | | | |
|---|---|---|---|
| 3,988,299 A | 10/1976 | Malofsky | |
| 4,556,700 A | 12/1985 | Harris et al. | |
| 4,622,414 A | 11/1986 | Mckervey | |
| 4,636,539 A | 1/1987 | Harris et al. | |
| 4,695,615 A | 9/1987 | Leonard et al. | |
| 4,718,966 A | 1/1988 | Harris et al. | |
| 4,837,260 A | 6/1989 | Sato et al. | |
| 4,855,461 A | 8/1989 | Harris et al. | |
| 4,906,317 A | 3/1990 | Liu | |
| 5,288,794 A | 2/1994 | Attarwala | |
| 5,306,752 A | 4/1994 | Attarwala | |
| 5,312,864 A | 5/1994 | Wenz et al. | |
| 5,328,944 A | 7/1994 | Attarwala et al. | |
| 5,424,343 A | 6/1995 | Attarwala | |
| 5,652,280 A | 7/1997 | Kutal | |
| 5,691,113 A * | 11/1997 | Kutal | C08F 2/50 430/274.1 |
| 5,922,783 A * | 7/1999 | Wojciak | C08F 2/48 522/18 |
| 6,093,780 A | 7/2000 | Attarwala | |
| 6,433,036 B1 | 8/2002 | Wojciak et al. | |
| 6,503,959 B1 | 1/2003 | Nishiyama et al. | |
| 6,726,795 B1 | 4/2004 | Wojciak et al. | |
| 6,867,241 B2 * | 3/2005 | Wojciak | C08F 22/32 522/12 |
| 6,906,112 B1 | 6/2005 | Wojciak et al. | |
| 6,965,040 B1 † | 11/2005 | Gao | |
| 7,064,155 B2 * | 6/2006 | Wojciak | C08F 22/32 156/275.5 |
| 9,080,084 B2 | 7/2015 | Konarski | |
| 2003/0162857 A1 | 8/2003 | Wojciak et al. | |
| 2014/0238603 A1 † | 8/2014 | Heemann | |
| 2015/0073110 A1 | 3/2015 | Malofsky et al. | |

FOREIGN PATENT DOCUMENTS

| | | | |
|---|---|---|---|
| JP | 2000330270 A | † | 11/2000 |
| JP | 2009-028668 A | | 2/2009 |
| JP | 2013-053199 A | | 3/2013 |
| JP | 2013053199 A | † | 3/2013 |

(Continued)

OTHER PUBLICATIONS

Kutal et al. A Novel Strategy Photoinitiated Anionic Polymerization. Macromoleculates, 1991, 24, 6872-6873 (Year: 1991).*
International Search Report issued in connection with International Patent Application No. PCT/US2017/020099 dated Jun. 8, 2017.
H.V. Coover, D.W. Dreifus and J.T. O'Connor, "Cyanoacrylate Adhesives" in Handbook of Adhesives, 27, 463-77, I. Skeist, ed., Van Nostrand Reinhold, New York, 3rd ed. (1990)].
Sanderson, C.T. et al. "Classical Metallocenes as Photoinitiators for the Anionic Polymerization of an Alkyl 2-Cyanocrylate" Macromolecules, 2002, vol. 35, No. 26, pp. 9648-9652.

(Continued)

*Primary Examiner* — Sanza L. McClendon

(74) *Attorney, Agent, or Firm* — Steven C. Bauman

(57) ABSTRACT

This invention relates to photocurable electron deficient olefin-containing compositions, such as those containing certain 2-cyanoacrylates, 2-cyanopentadienoates, methylidene malonates, and vinylidine cyanide, and photolatent bases. When exposed to radiation in the electromagnetic spectrum, the compositions show a delay cure property.

16 Claims, No Drawings

(56) References Cited

FOREIGN PATENT DOCUMENTS

WO          9531486        11/1995
WO    2013149165 A1 †  10/2013

OTHER PUBLICATIONS

James F. Cameron et al., "Photogeneration of Organic Bases from o-Nitrobenzyl-Derived Carbamates", J. Am. Chem. Soc., 1991, vol. 113, pp. 4303-4313.†

\* cited by examiner
† cited by third party

PHOTOCURABLE ELECTRON DEFICIENT OLEFIN-CONTAINING COMPOSITIONS

BACKGROUND

Field

This invention relates to photocurable electron deficient olefin-containing compositions, such as those containing certain 2-cyanoacrylates, 2-cyanopentadienoates, methylidene malonates, and vinylidine cyanide, and photolatent bases. When exposed to radiation in the electromagnetic spectrum, the compositions show a delay cure property.

Brief Description of Related Technology

Cyanoacrylate adhesives are known for their fast adhesion and ability to bond a wide variety of substrates. They are marketed as "super glue" type adhesives. They are useful as an all-purpose adhesive since they are a single component adhesive, very economical as only a small amount will do, and generally do not require any equipment to effectuate curing.

Cyanoacrylates generally are quick-setting materials which cure to clear, hard glassy resins, useful as sealants, coatings, and particularly adhesives for bonding together a variety of substrates [see e.g. H. V. Coover, D. W. Dreifus and J. T. O'Connor, "Cyanoacrylate Adhesives" in *Handbook of Adhesives*, 27, 463-77, I. Skeist, ed., Van Nostrand Reinhold, N.Y., 3rd ed. (1990)].

Ordinarily, upon contact with substrate materials possessing a surface nucleophile, cyanoacrylate-containing compositions spontaneously polymerize to form a cured material. The cured material exhibits excellent adhesive properties to materials such as metals, plastics, elastomers, fabrics, woods, ceramics and the like. Cyanoacrylate-containing compositions are thus seen as a versatile class of single-component, ambient temperature curing adhesives.

Henkel Corporation has issued a series of U.S. patents, the focus of which has been a photocurable composition comprising: (a) a 2-cyanoacrylate, monomer of the formula $H_2C-C(CN)-COOR$, wherein R is selected from $C_{1-15}$ alkyl, alkoxyalkyl, cycloalkyl, alkenyl, aralkyl, aryl, allyl and haloalkyl groups, (b) a metallocene component, and (c) a photoinitiator component. See U.S. Pat. No. 5,922,783 (Wojciak), U.S. Pat. No. 6,433,036 (Wojciak), U.S. Pat. No. 6,726,795 (Wojciak), and U.S. Pat. No. 6,906,112 (Wojciak). See also U.S. Pat. No. 6,503,959 (Mikuni).

In some cases, the composition has been activated by radiation in the visible range of the electromagnetic spectrum and the photoinitiator has been selected from dl-camphorquinone, bis($\eta^5$-2,4-cyclopentadien-1-yl)-bis[2,6-difluoro-3-(1H-pyrrol-1-yl)phenyl]titanium, bis(2,6-dimethoxybenzoyl-2,4,4-trimethyl pentyl) phosphine oxide, bis(2,4,6-trimethyl benzoyl) phenyl phosphine oxide and combinations thereof.

In other cases, the composition has been activated by radiation in the UV range of the electromagnetic spectrum. Sometimes, the composition has been activated by radiation in the UV and visible range of the electromagnetic spectrum.

In a variation, a photocurable composition comprising: (a) a 2-cyanoacrylate component, (b) a photoinitiated radical generating component, and (c) a photoinitiator component other than the photoinitiated radical generating component is provided. In this variation, the photoinitiator component is embodied by the following structure:

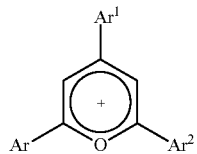

where each of Ar, $Ar^1$ and $Ar^2$ are aryl groups, with or without substitution, and $X^-$ is an anion. See U.S. Pat. No. 6,734,221 (Misiak).

In another variation, a composition comprising: (a) a 2-cyanoacrylate component, (b) a metallocene component, (c) a photoinitiator component, and (d) a luminescent dye is provided. See U.S. Pat. No. 7,064,155 (Wojciak).

In still another variation, a shelf stable photocurable composition comprising: (a) a 2-cyanoacrylate component, (b) a metallocene component, and (c) a photoinitiator component comprising the combination of a hydrogen abstraction photoinitiator and a hydrogen donor is provided. See U.S. Pat. No. 6,867,241 (Wojciak).

Delayed onset of cure and increased open times have been conferred on RedOx curable compositions. Indeed, Henkel Corporation introduced such a technology when it described a photolytically induced RedOx curable composition, comprising: (a) a RedOx curable component selected from vinyl ethers, alkenyl ethers, (meth)acrylates and combinations thereof; (b) a metallocene-containing photoinitiator; (c) a peroxide; and (d) an acidic activator component. See U.S. Pat. No. 9,080,084 (Konarski).

While multiple approaches to photocuring cyanoacrylates have been proposed, and some from Henkel Corporation are commercially successful, none appear to have a delay onset of cure.

Until now.

SUMMARY

Unlike the state of the technology, the present invention provides photocurable electron deficient olefin-containing compositions, such as those containing certain 2-cyanoacrylates, 2-cyanopentadienoates, methylidene malonates, and vinylidine cyanide, and photolatent bases. When exposed to radiation in the electromagnetic spectrum, the compositions show a delay cure property.

The present invention also provides compositions, together with a stabilizer package comprising at least one of a free radical stabilizer and an anionic stabilizer; and optionally, one or more additives selected from cure accelerators, thickeners, thixotropes, tougheners, thermal resistance-conferring agents, or plasticizers.

The inventive compositions confer benefits over known photocurable cyanoacrylate compositions, including among others: shelf-life stability over prolonged periods of time at ambient temperature when stored in the dark with little to no loss of reactivity; the ability to assemble parts made of opaque (or marginally light transmissive) materials controlled dosing provides a mechanism for photo-activation that allows assembly of non-UV light transparent substrates; surface insensitivity in that substrates constructed from a wide variety of materials may be bonded; good delay cure features, which permits tuning to either a longer or shorter open time; and improved cure through large depths (or gaps) and independent of the substrate type may be achieved with the inventive compositions.

Conventional photocurable cyanoacrylate technology struggles to provide these features and thus ordinarily its use is restricted to the assembly of transparent adherends; to small bondline gaps; and the application of a two step activator (or primer) prior to or after application of conventional cyanoacrylates because they do not cure on neutral (e.g., polyolefin-constructed substrates) or acidic (e.g., phenolic) surfaces.

DETAILED DESCRIPTION

As noted above, the present invention provides photocurable electron deficient olefin-containing compositions, such as those containing certain 2-cyanoacrylates, 2-cyanopentadienoates, methylidene malonates, and vinylidine cyanide, and photolatent bases. When exposed to radiation in the electromagnetic spectrum, the compositions show a delay cure property.

The cyanoacrylate may be chosen from one or more of mono-functional 2-cyanoacrylates, di-functional cyanoacrylates, and poly-functional 2-cyanoacrylates.

More specifically, the cyanoacrylate may be one within the following structure:

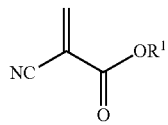

where in this connection $R^1$ is selected from $C_{1-16}$ alkyl, $C_{2-16}$ alkoxyalkyl, $C_{3-16}$ cycloalkyl, $C_{2-16}$ alkenyl (such as allyl), $C_{2-16}$ alkynyl, $C_{5-16}$ aryl, $C_{7-16}$ arylalkyl, or $C_{1-16}$ haloalkyl groups.

The cyanoacrylate with this structure is selected from methyl cyanoacrylate, ethyl-2-cyanoacrylate, propyl cyanoacrylates, butyl cyanoacrylates, octyl cyanoacrylates, allyl cyanoacrylate, ß-methoxyethyl cyanoacrylate and combinations thereof.

The methylidene malonate is one within the following structure:

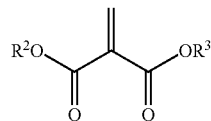

where in this connection $R^2$ and $R^3$ are each independently selected from $C_{1-16}$ alkyl, alkoxyalkyl, cycloalkyl, alkenyl, aralkyl, aryl, allyl or haloalkyl groups.

The photolatent base is within the following structure:

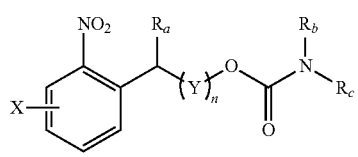

where X is any one of hydrogen, alkyl, hydroxyl, thiol or heteroalkyl, Y is an alkylene linkage, Ra is an alkyl group having from one to four carbon atoms or an alkenyl group having from two to four carbon atoms, Rb is an alkyl group having from one to four carbon atoms or an alkenyl group having from two to four carbon atoms, Rc is an alkyl group having from one to four carbon atoms or an alkenyl group having from two to four carbon atoms, or Rb and Rc taken together form a cyclic ring structure of three to seven ring atoms, which may be interrupted by one or more heteroatoms, and n is 0 or 1.

Within this structure are a variety of possible compounds, including carbamates made from the reaction of 2-(2-nitrophenyl)propyl chloroformate and secondary amines or the reaction of 2-(2-nitrophenyl)propanol or α-methyl-2-nitrobenzyl alcohols more generally and dialkylcarbamyl halides. For instance, the ortho-nitrophenylpropoxy carbonyl or α-methyl-ortho-nitrobenzyl oxycarbonyl of piperidine, morpholinediisopropylamine, dicyclohexylamine, diethanolamine, or dimethylamine.

More specifically, and particularly desirable are [(α-methyl-2-nitrobenzyl)oxycarbonyl]morpholine ("NBM"), [(2-nitrobenzyl)oxycarbonyl] dimethylamine ("NBDMA"), and 2-(2-nitrophenyl)propoxycarbonyl piperidine.

Suitable stabilizers include stabilizer packages that may contain one or more of free radical stabilizers and acidic stabilizers.

For example, free radical stabilizers include hydroquinone, pyrocatechol, resorcinol or derivatives thereof, such as hydroquinone monoethyl ether, or phenols, such as di-t-butylphenol or 2,6-di-t-butyl-p-cresol, 2,2'-methylene-bis-(4-methyl-6-t-butylphenol), bisphenol A, dihydroxydiphenylmethane, and styrenized phenols.

For example, acidic stabilizers include sulfuric acid, hydrochloric acid, sulfonic acids, such as methane, ethane or higher sulfonic acids, p-toluene sulfonic acid, phosphoric acid or polyphosphoric acids, silyl esters of strong acids, such as trialkyl chlorosilanes, dialkyl dichlorosilanes, alkyl trichlorosilanes, tetrachlorosilane, trialkyl silylsulfonic acids, trialkyl silyl-p-toluene sulfonates, bis-trialkyl silylsulfate and trialkyl silylphosphoric acid esters.

The amount of either stabilizer used to stabilize the electron deficient olefin prepared by the inventive processes is well known to those of ordinary skill in the art, and may be varied depending on the properties of the resulting composition made from the selected electron deficient olefin.

The inventive compositions may include one or more additives selected from cure accelerators, thickeners, thixotropes, tougheners, thermal resistance-conferring agents, or plasticizers.

The cure accelerators that may be included with the inventive electron deficient olefins to form inventive compositions include calixarenes and oxacalixarenes, silacrowns, crown ethers, cyclodextrins, poly(ethyleneglycol) di(meth)acrylates, ethoxylated hydric compounds and combinations thereof.

Of the calixarenes and oxacalixarenes, many are known, and are reported in the patent literature. See e.g. U.S. Pat. Nos. 4,556,700, 4,622,414, 4,636,539, 4,695,615, 4,718, 966, and 4,855,461, the disclosures of each of which are hereby expressly incorporated herein by reference.

For instance, as regards calixarenes, those within the following structure are useful herein:

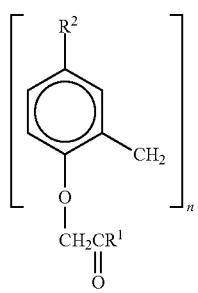

where in this connection $R^1$ is alkyl, alkoxy, substituted alkyl or substituted alkoxy; $R^2$ is H or alkyl; and n is 4, 6 or 8.

One particularly desirable calixarene is tetrabutyl tetra[2-ethoxy-2-oxoethoxy]calix-4-arene.

A host of crown ethers are known. For instance, examples which may be used herein include 15-crown-5, 18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphtyl-16-crown-5, 1,2-methyl-benzo-18-crown-6, 1,2-methylbenzo-5, 6-methylbenzo-18-crown-6, 1,2-t-butyl-18-crown-6, 1,2-vinylbenzo-15-crown-5, 1,2-vinyl-benzo-18-crown-6, 1,2-t-butyl-cyclohexyl-18-crown-6, asym-dibenzo-22-crown-6 and 1,2-benzo-1,4-benzo-5-oxygen-20-crown-7. See U.S. Pat. No. 4,837,260 (Sato), the disclosure of which is hereby expressly incorporated here by reference.

Of the silacrowns, again many are known, and are reported in the literature. For instance, a typical silacrown may be represented within the following structure:

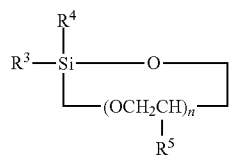

where in this connection $R^3$ and $R^4$ are organo groups which do not themselves cause polymerization of the cyanoacrylate monomer, $R^5$ is H or $CH_3$ and n is an integer of between 1 and 4. Examples of suitable $R^3$ and $R^4$ groups are R groups, alkoxy groups, such as methoxy, and aryloxy groups, such as phenoxy. The $R^3$ and $R^4$ groups may contain halogen or other substituents, an example being trifluoropropyl. However, groups not suitable as $R^4$ and $R^5$ groups are basic groups, such as amino, substituted amino and alkylamino.

Specific examples of silacrown compounds useful in the inventive compositions include:

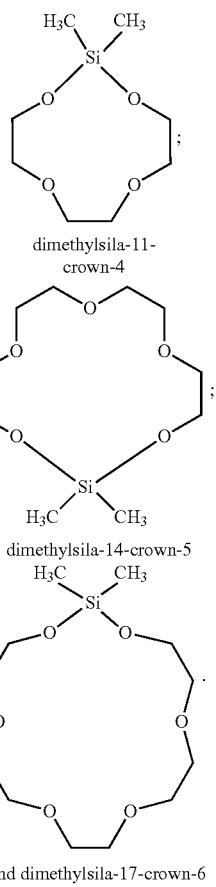

See e.g. U.S. Pat. No. 4,906,317 (Liu), the disclosure of which is hereby expressly incorporated herein by reference.

Many cyclodextrins may be used in connection with the present invention. For instance, those described and claimed in U.S. Pat. No. 5,312,864 (Wenz), the disclosure of which is hereby expressly incorporated herein by reference, as hydroxyl group derivatives of an α-, β- or γ-cyclodextrin which is at least partly soluble in the cyanoacrylate would be appropriate choices for use herein as the first accelerator component.

For instance, poly(ethylene glycol) di(meth)acrylates suitable for use herein include those within the following structure:

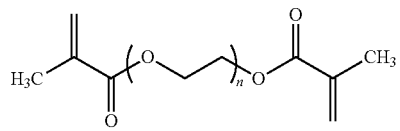

where n is greater than 3, such as within the range of 3 to 12, with n being 9 as particularly desirable. More specific examples include PEG 200 DMA (where n is about 4), PEG 400 DMA (where n is about 9), PEG 600 DMA (where n is about 14), and PEG 800 DMA (where n is about 19), where the number (e.g., 400) represents the average molecular weight of the glycol portion of the molecule, excluding the two methacrylate groups, expressed as grams/mole (i.e., 400 g/mol). A particularly desirable PEG DMA is PEG 400 DMA.

And of the ethoxylated hydric compounds (or ethoxylated fatty alcohols that may be employed), appropriate ones may be chosen from those within the following structure:

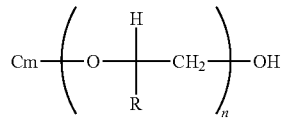

where $C_m$ can be a linear or branched alkyl or alkenyl chain, m is an integer between 1 to 30, such as from 5 to 20, n is an integer between 2 to 30, such as from 5 to 15, and R in this connection may be H or alkyl, such as $C_{1-6}$ alkyl.

When used, the cure accelerator should be included in the compositions in an amount within the range of from about 0.01% to about 10% by weight, with the range of about 0.1 to about 0.5% by weight being desirable, and about 0.4% by weight of the total composition being particularly desirable.

Other additives may be included with the inventive electron deficient olefins to form inventive compositions to confer additional physical properties, such as improved shock resistance, thickness (for instance, polymethyl methacrylate), thixotropy (for instance fumed silica), color, and enhanced resistance to thermal degradation [for instance, maleimide compounds such as N,N'-meta-phenylene bismaleimide (see U.S. Pat. No. 3,988,299 (Malofsky)), certain mono, poly or hetero aromatic compounds characterized by at least three substitutions on an aromatic ring thereof, two or more of which being electron withdrawing groups (see U.S. Pat. No. 5,288,794 (Attarwala)), certain quinoid compounds (see U.S. Pat. No. 5,306,752 (Attarwala)), certain sulfur-containing compounds, such as an anhydrosulfite, a sulfoxide, a sulfite, a sulfonate, a methanesulfonate or a p-toluenesulfonate (see U.S. Pat. No. 5,328,944 (Attarwala)), or certain sulfur-containing compounds, such as a sulfinate, a cyclic sultinate naphthosultone compound substituted with at least one strong electron withdrawing group at least as strongly electron withdrawing as nitro (see U.S. Pat. No. 5,424,343 (Attarwala)), and alkylating agents such as polyvinyl benzyl chloride, 4-nitrobenzyl chloride, and combinations thereof, silylating agents, and combinations thereof (see U.S. Pat. No. 6,093,780 (Attarwala)), the disclosures of each of which are hereby incorporated herein by reference].

These other additives may be used in the inventive compositions individually in an amount from about 0.05% to about 20%, such as about 1% to 15%, desirably 5% to 10% by weight, depending of course on the identity of the additive. For instance, and more specifically, citric acid may be used in the inventive compositions in an amount of 5 to 500 ppm, desirably 10 to 100 ppm.

In addition, the present invention further provides compositions that include a coreactant, such as one selected from epoxides (such as cycloaliphatic epoxies), episulfides, oxetanes, thioxetanes, dioxolanes, dioxanes, isocyanates, polyuretahnes, polyamides, maleimides, oxazines, oxazolines, (meth)acrylates, acrylamides, or vinyl ethers.

The following examples are intended to illustrate but in no way limit the present invention.

EXAMPLES

Example 1—Synthesis

[(α-methyl-2-nitrobenzyl) oxycarbonyl]morpholine ("NBM")

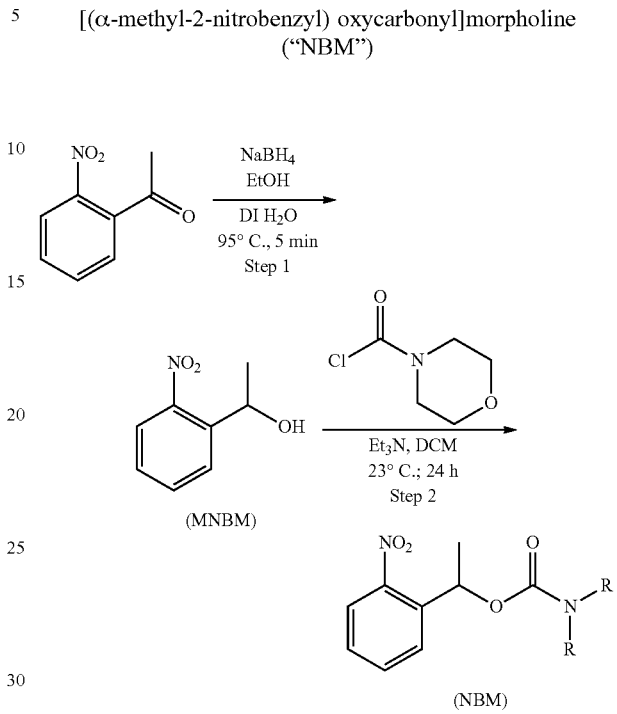

In this two-step synthesis of [(α-methyl-2-nitrobenzyl) oxycarbonyl]morpholine ("NBM"), the first step involves the synthesis of the intermediate, α-methyl-2-nitrobenzyl-methanol ("MNBN"). In order to do so, to a three-neck 1-L reaction flask, open to air and equipped with a magnetic stirring bar, condenser, heating mantle, and thermocouple, was added 20 g (0.12 mole) of 2-nitroacetophenone (Sigma-Aldrich, 95%) and 260 mL of ethanol (ACS reagent grade, >99.5%). The mixture was stirred until a clear solution was obtained. Then 4.61 g (0.12 mole) of sodium borohydride (Sigma-Aldrich, powder, 98%) was added in stages, keeping the reaction temperature below 50° C. After all the sodium borohydride was added, 200 mL of de-ionized water was then added and the mixture heated to reflux. After five minutes at reflux temperature, the reaction flask was cooled quickly by immersion in an ice-water bath.

The crude reaction mixture was transferred to a 1-L separatory funnel with 200 mL dichloromethane (Sigma-Aldrich, reagent grade) and shaken. On standing the mixture separated into two layers and the lower dichloromethane was removed. The residual water layer was then extracted with additional portions of dichloromethane (3×200 mL) and the combined dichloromethane extracts were dried over sodium sulfate until a clear solution was obtained (2 hours). The solution was filtered to remove sodium sulfate and the solvent removed by distillation under reduced pressure to yield the crude intermediate as an amber-colored oil (19.72 g; 98% yield). The crude product was purified by flash chromatography on a high performance silica column (CombiFlash Rf RediSep 330 g Gold) using a hexane/ethyl acetate gradient solvent blend at flow rate of 200 mL/min. Fractions corresponding to the major component were combined and the solvent removed under reduced pressure to produce MNBN in 85% yield.

The structure of the product was confirmed by $^1$H NMR spectroscopic analysis.

In the second step, to a three-neck 250-mL flask equipped with a magnetic stir bar, condenser, and thermocouple, was added 19.58 g (0.119 mole) of purified MNBN, 12.02 g of trimethylamine (Sigma Aldrich, >99%), 30 mL dichloromethane (Sigma Aldrich, reagent grade) and 1.45 g (0.0119 mole) of 4-(dimethylamino)pyridine (Sigma Aldrich, >99%). The solution was stirred at ambient temperature and 17.80 g (0.119 mole) 4-morpholinecarbonyl chloride (Sigma Aldrich, 98%) was added slowly during which time the reaction temperature increased to about 50° C. The mixture was allowed to cool to ambient temperature and the stirring was continued. After 24 hours, an infrared spectrum of the mixture indicated the esterification reaction was complete (no further change in IR absorbance peak at 1690 cm$^{-1}$).

The reaction mixture was diluted by addition of 170 mL of dichloromethane and washed with 5% solution of hydrochloric acid (3×200 mL). The organic layer was separated, dried over sodium sulfate and filtered. The solvent was removed by distillation under reduced pressure to give a lightly colored oil that was purified by flash chromatography according to the procedure already described. The purified product was obtained in 87% yield and identified as NBM by $^1$H NMR spectroscopic analysis.

Example 2—Synthesis

[(2-nitrobenzyl)oxycarbonyl] dimethylamine ("NBDMA")

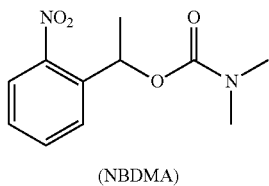

(NBDMA)

The procedure of Example 1 was repeated using dimethylaminecarbonyl chloride in place of 4-morpholinecarbonyl chloride. The resulting product, [(2-nitrobenzyl)oxycarbonyl] dimethylamine ("NBDMA") was isolated in 87% yield.

Example 3

Photoactivatable Cyanoacrylate/NBM Compositions

Photoactivatable cyanoacrylate compositions were prepared by blending together, under yellow lights, the components listed in Table 1.

TABLE 1

| Component | Composition/Amt (wt %) | | |
|---|---|---|---|
| | A | B | C |
| Ethyl 2-cyanoacrylate | 99.0 | 99.0 | 99.0 |
| NBM (example 1) | 1.0 | 1.0 | 0 |
| Boron trifluoride (ppm) | 41 | 5 | 5 |

Composition A, containing 41 part per million (ppm) BF$_3$ was a clear storage-stable, low viscosity solution product that showed no signs of increasing viscosity (instability) after 3 months storage at ambient temperature in the dark. In contrast, Composition B, with 5 ppm BF$_3$, was found to contain a small amount of a gel component that appeared before the photolatent base was dissolved.

The result indicated that a concentration of BF$_3$ stabilizer in excess of 5 ppm and less than or equal to 41 ppm provides for adequate shelf-stability of a cyanoacrylate composition having about 1% by weight NBM in ethyl-2-cyanoacrylate. Composition C, containing 5 ppm BF$_3$ and without added NBM, was included for comparative purposes. This composition was stable at ambient temperature over a prolonged period of time.

Example 4

UV Light Initiated Curing/Activation of NBM-Containing Ethyl 2-Cyanoacrylate Compositions Coatings of stabilized uncured Compositions A and C (from Example 3) were prepared by placing 5-6 drops of the composition onto cleaned high density polyethylene substrates with dimensions 25×25 mm$^2$ in area and 5 mm in thickness. The substrates were first cleaned by rinsing the surface with isopropanol and allowing the substrates to dry under air flow. The drops spread on the surface to provide a film approximately 0.5 mm in thickness.

The coated substrates were then placed 30 cm directly below the medium pressure mercury arc lamp of a Zeta 7216 air cooled UV curing chamber and exposed to UV light for different exposure times. Light intensity measurements were made at the coating surface using a calibrated UV radiometer (UV Power Puck™ supplied by EIT) and were noted as follows: UVA 91 mW/cm$^2$; UVB 76 mW/cm$^2$; UVC 57 mW/cm$^2$; and UVV 186 mW/cm$^2$. After exposure, the degree of curing of each coating was qualitatively assessed by examining the state of the irradiated coating and the degree of curing was classified as follows: "No cure" indicating a fully liquid coating with no observable increase in solution viscosity; "Partial cure" indicating a significant increase in initial solution viscosity or the formation of a tacky polymer; and "fully cured" indicating formation of a dry, hard, solid polymeric coating. Coatings that were not fully cured following UV exposure, were then stored in the dark at ambient temperature and periodically reexamined until curing or no further change in state was observed. The results of are captured below in Table 2.

TABLE 2

| UV Exposure time (sec) | Post-exposure dark storage time (min) | Degree of Cure | |
|---|---|---|---|
| | | Composition A | Composition C |
| 60 | 0 | No cure | No cure |
| | 4 | No cure | No cure |
| | 14 | Partial cure | No cure |
| | 24 | Partial cure | No cure |
| | 34 | Partial cure | No cure |
| | 90 | Fully cured | No cure |
| 90 | 0 | Partial cure | No cure |
| | 3 | Partial cure | No cure |
| | 10 | Fully cured | No cure |
| | 90 | — | No cure |
| 120 | 0 | Fully cured | No cure |

Under the conditions described, Composition A was fully cured following 120 seconds exposure to UV light. In contrast, Composition C (comparative) showed no signs of curing under the same conditions. Coating specimens that were not fully cured after UV exposure period were then placed in the dark at ambient temperature and the curing monitored in the same manner until full cure or no further changes in degree of cure were observed.

All irradiated samples of Composition A not fully cured after UV exposure were observed to undergo subsequent curing in the dark at ambient temperature to eventually provide fully cured films. The rate of post curing was found to increase as a function of the initial exposure time or dose: 90 minutes full cure time for initial 60 seconds exposure; and 10 minutes full cure time for initial 90 seconds exposure. In contrast, Composition C showed no photo-induced curing under any of the conditions examined.

These results clearly demonstrate that NBM functions as both a photoinitiator and a photoactivating agent for the curing of the cyanoacrylate, which is the basis of the composition. In the absence of UV light, compositions of cyanoacrylates and NBM and can be maintained as low viscosity liquids for prolonged periods of time. However upon irradiation with UV light, solutions undergo a curing reaction, during which low molecular weight liquid monomers are converted into high molecular weight solid polymers with good adhesive properties.

The NBM may function either as a photoinitiator or a photo-activating agent depending on the dose of UV radiation delivered during the exposure period. At relatively high doses (long exposure times) full curing is effected during the irradiation period and, under such conditions, NBM behaves as a photoinitiator. In contrast, at relatively low doses curing does not take place during exposure, but the adhesive composition becomes "activated" and undergoes subsequent curing that proceeds more slowly in the dark.

Generally, exposure to relatively low UV doses (e.g. 1 J/cm$^2$; 10 sec at 100 mW/cm$^2$) activates the compositions such that they remain in a liquid state for several minutes before curing is initiated. This allows the bonding of substrates that are opaque to UV light and provides time to correctly align substrates before permanent fixtures occur. At higher UV doses (e.g. 3 J/cm$^2$; 30 sec at 100 mW/cm$^2$), full curing can be accomplished during the irradiation period. The delay or open time can be controlled by adjusting the photolatent base/stabilizer ratio.

Example 5

UV Light Initiated Curing/Activation of NPC-Containing Ethyl 2-Cyanoacrylate Compositions

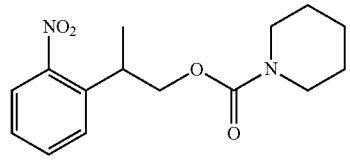 [SMILES: CC(COC(=O)N1CCCCC1)c1ccccc1[N+](=O)[O-]]

2-(2-Nitrophenyl)propoxycarbonyl ("NPC"), prepared as describe in U.S. Pat. No. 6,965,040, was also found to be a useful photocuring and photoactivating agent for cyanoacrylates.

A cyanoacrylate composition containing NPC was prepared by mixing together, under yellow lights, the components listed in Table 3.

TABLE 3

| Component | Composition D/Amt (wt %) |
|---|---|
| Ethyl 2-cyanoacrylate | 99.0 |
| NPC | 1.0 |
| Boron trifluoride (ppm) | 40 |

Coatings of Composition D were prepared on polyethylene substrates as described in Example 4 and exposed to UV light from a Zeta 7730 UV light guide lamp. The samples were placed 1.5 cm directly below the tip of the light guide where the light intensity, measured as described in Example 4, was found to be as follows: UVA 96 mW/cm$^2$; UVB 62 mW/cm$^2$; UVC 0 mW/cm$^2$; and UVV 48 mW/cm$^2$. After exposure, the degree of curing of each coating was qualitatively assessed by examining the state of the irradiated coating and the degree of curing was classified as described in Example 4. Coatings that were not fully cured following UV exposure, were then stored in the dark at ambient temperature and periodically reexamined until curing or no further change in state was observed. For comparative purposes, Composition C was tested under the same conditions.

TABLE 4

| UV Exposure time (sec) | Post-exposure dark storage time (min) | Degree of cure Composition D | Degree of cure Composition C |
|---|---|---|---|
| 10 | 0 | No cure | No cure |
|  | 7 | Partial cure | No cure |
|  | 10 | Fully cured | No cure |
| 20 | 0 | No cure | No cure |
|  | 10 | Fully cured | No cure |
| 30 | 0 | Fully cured | No cure |
|  | 10 | — | No cure |
|  | 60 | — | No cure |
| 90 | 0 | — | No cure |
|  | 10 | — | No cure |

The results, presented in Table 4, clearly demonstrate that NPC, like NBM, is an effective photoinitiator or photoactivator for cyanoacrylates. These tests also indicate that the UVC component of UV radiation is not required for NPC to be effective. Composition D showed excellent storage stability with no observable increase in viscosity after 8 weeks storage in dark at room temperature and no loss in photochemical activity.

What is claimed is:
1. A photocurable composition comprising:
   (a) An electron deficient olefin; and
   (b) A photolatent base, wherein the photolatent base is within the following structure:

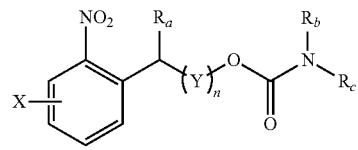

wherein X is X is any one of hydrogen, alkyl, hydroxyl, thiol or heteroalkyl, Y is an alkylene linkage, Ra is an alkyl group having from one to four carbon atoms or an alkenyl group having from two to four carbon atoms, Rb is an alkyl group having from one to four carbon atoms or an alkenyl group having from two to four carbon atoms, Rc is an alkyl group having from one to four carbon atoms or an alkenyl group having from two to four carbon atoms, or Rb and Rc taken together form a cyclic ring structure of three to seven ring atoms, which may be interrupted by one or more heteroatoms, and n is 0 or 1.

2. A photocurable composition comprising:
(a) An electron deficient olefin; and
(b) A photolatent base, wherein the photolatent base is a member selected from the group consisting of [(α-methyl-2-nitrobenzyl) oxycarbonyl]morpholine, [(2-nitrobenzyl)oxycarbonyl] dimethylamine, and 2-(2-nitrophenyl)propoxycarbonyl piperidine.

3. The composition of claim 1, wherein the electron deficient olefin is a member selected from the group consisting of 2-cyanoacrylates, 2-cyanopentadienoates, methylidene malonates, and vinylidine cyanide.

4. The composition of claim 3, wherein the 2-cyanoacrylate is a member selected from the group consisting of mono-functional 2-cyanoacrylates, di-functional cyanoacrylates, poly-functional 2-cyanoacrylates and combinations thereof.

5. The composition of claim 3, wherein the 2-cyanoacrylate is within the following structure:

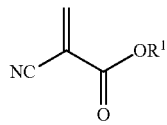

wherein in this connection $R^1$ is selected from $C_{1-16}$ alkyl, $C_{2-16}$ alkoxyalkyl, $C_{3-16}$ cycloalkyl, $C_{2-16}$ alkenyl, $C_{2-16}$ alkynyl, $C_{5-16}$ aryl, $C_{7-16}$ arylalkyl, or $C_{1-16}$ haloalkyl groups.

6. The composition of claim 3, wherein the 2-cyanoacrylate is selected from methyl cyanoacrylate, ethyl-2-cyanoacrylate, propyl cyanoacrylates, butyl cyanoacrylates, octyl cyanoacrylates, allyl cyanoacrylate, β-methoxyethyl cyanoacrylate and combinations thereof.

7. The composition of claim 1, further comprising a stabilizer package comprising at least one of a free radical stabilizer and an anionic stabilizer.

8. The composition of claim 1, further comprising one or more additives selected from the group consisting of cure accelerators, thickeners, thixotropes, tougheners, thermal resistance-conferring agents, and plasticizers.

9. The composition of claim 1, further comprising one or more coreactants selected from the group consisting of epoxides, episulfides, oxetanes, thioxetanes, dioxolanes, dioxanes, isocyanates, polyurethanes, polyamides, maleimides, oxazines, oxazolines, (meth)acrylates, acrylamides, and vinyl ethers.

10. The composition of claim 2, wherein the electron deficient olefin is a member selected from the group consisting of 2-cyanoacrylates, 2-cyanopentadienoates, methylidene malonates, and vinylidine cyanide.

11. The composition of claim 10, wherein the 2-cyanoacrylate is a member selected from the group consisting of mono-functional 2-cyanoacrylates, di-functional cyanoacrylates, poly-functional 2-cyanoacrylates and combinations thereof.

12. The composition of claim 10, wherein the 2-cyanoacrylate is within the following structure:

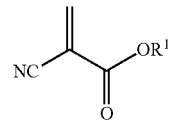

wherein in this connection $R^1$ is selected from $C_{1-16}$ alkyl, $C_{2-16}$ alkoxyalkyl, $C_{3-16}$ cycloalkyl, $C_{2-16}$ alkenyl, $C_{2-16}$ alkynyl, $C_{5-16}$ aryl, $C_{7-16}$ arylalkyl, or $C_{1-16}$ haloalkyl groups.

13. The composition of claim 10, wherein the 2-cyanoacrylate is selected from methyl cyanoacrylate, ethyl-2-cyanoacrylate, propyl cyanoacrylates, butyl cyanoacrylates, octyl cyanoacrylates, allyl cyanoacrylate, β-methoxyethyl cyanoacrylate and combinations thereof.

14. The composition of claim 10, further comprising a stabilizer package comprising at least one of a free radical stabilizer and an anionic stabilizer.

15. The composition of claim 10, further comprising one or more additives selected from the group consisting of cure accelerators, thickeners, thixotropes, tougheners, thermal resistance-conferring agents, and plasticizers.

16. The composition of claim 10, further comprising one or more coreactants selected from the group consisting of epoxides, episulfides, oxetanes, thioxetanes, dioxolanes, dioxanes, isocyanates, polyurethanes, polyamides, maleimides, oxazines, oxazolines, (meth)acrylates, acrylamides, and vinyl ethers.

* * * * *